(12) United States Patent
Uhr

(10) Patent No.: US 11,906,270 B2
(45) Date of Patent: Feb. 20, 2024

(54) DRY FIRE TRAINING DEVICE

(71) Applicant: Oren Louis Uhr, Rishon le Zion (IL)

(72) Inventor: Oren Louis Uhr, Rishon le Zion (IL)

( * ) Notice: Subject to any disclaimer, the term of this patent is extended or adjusted under 35 U.S.C. 154(b) by 0 days.

(21) Appl. No.: 18/072,787

(22) Filed: Dec. 1, 2022

(65) Prior Publication Data

US 2023/0106290 A1 Apr. 6, 2023

Related U.S. Application Data

(63) Continuation of application No. 17/860,432, filed on Jul. 8, 2022, now Pat. No. 11,680,775, which is a continuation of application No. 16/670,985, filed on Oct. 31, 2019, now Pat. No. 11,415,394, which is a continuation of application No. 15/708,054, filed on Sep. 18, 2017, now Pat. No. 10,466,012, which is a continuation of application No. 14/868,357, filed on Sep. 28, 2015, now Pat. No. 9,766,043, which is a continuation of application No. 14/105,156, filed on Dec. 12, 2013, now Pat. No. 9,163,904, which is a continuation of application No. 13/008,234, filed on Jan. 18, 2011, now Pat. No. 8,734,156.

(60) Provisional application No. 61/296,045, filed on Jan. 19, 2010.

(51) Int. Cl.
*F41G 3/26* (2006.01)
*F41A 17/44* (2006.01)
*F41A 33/02* (2006.01)
*F41A 35/00* (2006.01)
*G09B 5/00* (2006.01)

(52) U.S. Cl.
CPC ............ *F41G 3/2655* (2013.01); *F41A 17/44* (2013.01); *F41A 33/02* (2013.01); *F41A 35/00* (2013.01); *G09B 5/00* (2013.01)

(58) Field of Classification Search
CPC .......... F41G 3/26; F41G 3/2655; F41A 17/44; F41A 33/00; F41A 33/02; F41A 33/04; F41A 33/06; F41A 35/00; G09B 5/00
See application file for complete search history.

(56) References Cited

U.S. PATENT DOCUMENTS

| | | |
|---|---|---|
| 3,898,747 A | 8/1975 | Marshall |
| 5,909,951 A | 6/1999 | Johnsen et al. |
| 8,690,576 B2 | 4/2014 | Murphy et al. |
| 2007/0190495 A1 | 8/2007 | Kendir et al. |
| 2010/0227298 A1* | 9/2010 | Charles .................. F41A 33/00 434/21 |
| 2012/0129136 A1 | 5/2012 | Dvorak |

* cited by examiner

*Primary Examiner* — Timothy A Musselman
(74) *Attorney, Agent, or Firm* — Dilworth & Barrese, LLP.; Michael J. Musella, Esq.

(57) ABSTRACT

A multi-function dry fire training device to be inserted into the chamber of a firearm, which comprises an illuminator for emitting, upon receiving a command from a controller, a beam of visible or invisible illumination from the barrel of the firearm, the beam being parallel to its central axis; a controller for controlling the functionality of the device including illumination of the illuminator, in response to activation of the firearm trigger; an actuator, being electrically connected to the controller, for activating the controller whenever being struck by the firearm striker and a power source for providing DC power to the controller and illuminator.

4 Claims, 9 Drawing Sheets

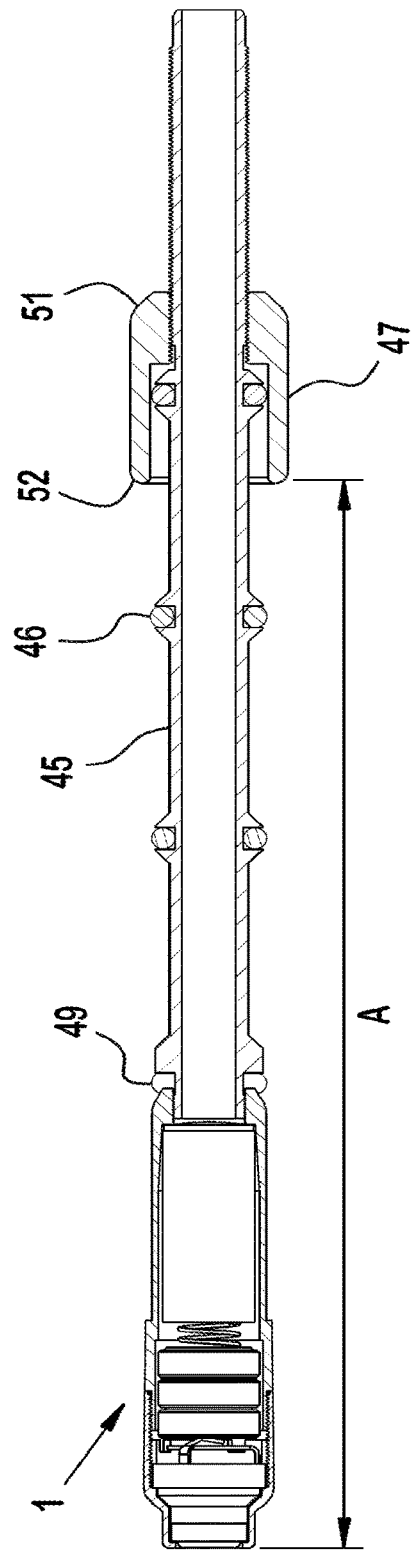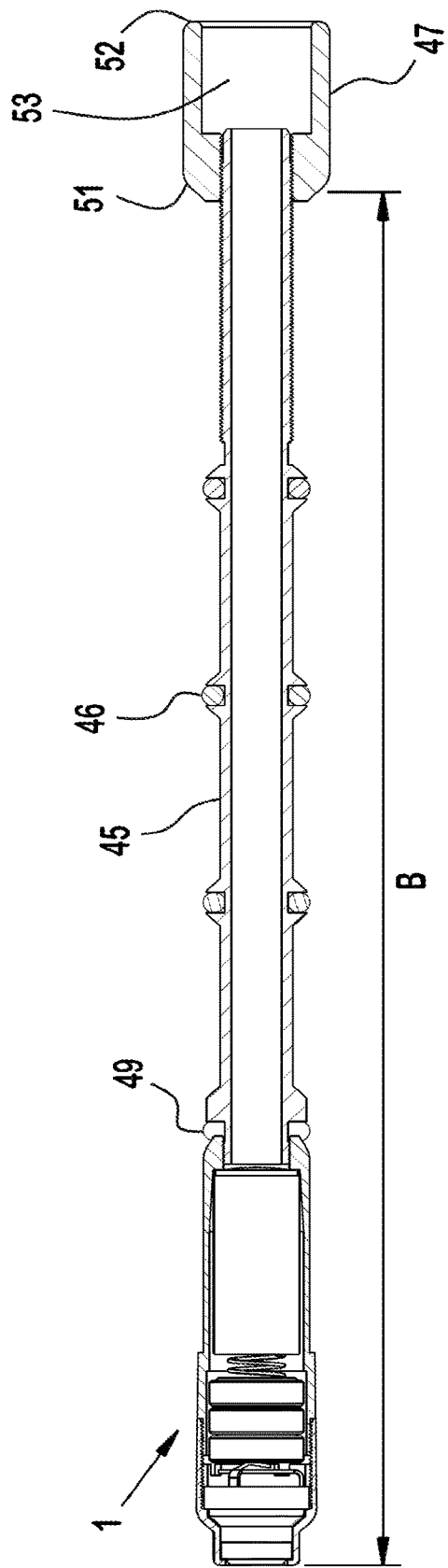
FIG. 8A
FIG. 8B

DRY FIRE TRAINING DEVICE

CROSS REFERENCE TO RELATED APPLICATIONS

This application is a continuation of application Ser. No. 17/860,432 filed Jul. 8, 2022 which is a continuation of application Ser. No. 16/670,985 filed Oct. 31, 2019 which is a continuation of application Ser. No. 15/708,054 filed Sep. 18, 2017, now U.S. Pat. No. 10,466,012, which is a continuation of application Ser. No. 14/868,357 filed Sep. 28, 2015, now U.S. Pat. No. 9,766,043, which is a continuation of application Ser. No. 14/105,156 filed Dec. 12, 2013 now U.S. Pat. No. 9,163,904, which is a continuation of application Ser. No. 13/008,234 filed Jan. 18, 2011, now U.S. Pat. No. 8,734,156, which claims the benefit of provisional Application No. 61/296,045 filed Jan. 19, 2010. The disclosure of each of these applications is incorporated by reference herein in their entirety.

FIELD OF THE INVENTION

The present invention generally relates to a device and system for simulating live fire training from a wide variety of handheld firearms. More particularly, this invention relates to a processor controlled, light emitting, ammunition for a firearm. This invention also relates to a system for registering "hits" during dry-fire exercises and/or gaming with any handheld firearm, without changing the feel or the external dimensions of the firearm.

BACKGROUND

Dry fire training—repeated drawing, aiming and firing without ammunition—is a practical, convenient way to improve and/or maintain shooting techniques. The practice is limited, however, by the fact that the bullet impact point is a mere assumption; thus the trainees and/or trainers are limited in their ability to evaluate the trainees performance or/and improve their skills. Furthermore, there has long existed the need for an apparatus and system whereby a single or multiple user, or trainer and trainee can readily practice using a firearm without placing themselves or others at risk of accidental discharge of the firearm while still maintaining the ability to recognize the "hits." This safety imperative coincides with an added desire to limit the financial burden related to the wear and tear on a firearm, including cost of ammunition and use of adequate facilities brought about by live fire training. In addition, in order to overcome the location restraints required for live fire training and enable an effective training alternative, to conducting a training session in any desired location, such as a private residence.

These considerations have proven to be especially relevant to law-enforcement and military personnel, who require a high degree of firearm practice and proficiency. In such situations, "Force on Force" drills pose a heightened risk to users, as the muzzle of firearm points toward other users, increasing the likelihood of accidental and potentially fatal discharge. It is well documented that Training Officers (TOs) have been injured or fatally wounded due to several loading/unloading procedures, such that a live round reaches the chamber of a firearm without the fellow officer being able to discern that he is facing a loaded weapon.

In addition, the traditional means of seeking to recognize marksmanship technique errors and resolve them during firearm training, whereby a user at a shooting range fires live ammunition at a target with or without the guidance of an instructor, has proven to have several significant drawbacks. During live fire, it is extremely difficult to identify many of the various marksmanship technique errors related to how the shooter handles the firearm prior to and while pulling the trigger. For example, it requires a well-trained instructor to identify a shooter that is surprised or frightened by the recoil of a handgun or rifle, leading to the shooter to develop a habit known as "flinching," in an attempt to counter the anticipated recoil. This is detrimental to the correct posture and follow-through of the most critical phase of the shot. Furthermore, when the recoil is eliminated, any other errors in marksmanship technique are easier to identify and correct. Another drawback is the general inconveniences of accessing the shooting range. The more prevalent of these drawbacks include the above-mentioned risk of accidental discharge of firearms (by the user or others at the shooting range), but also may increase the stress level of the trainee due to the dangers of proximity to live fire training, and to the physical nature of shooting, i.e., sound and movement.

Accordingly, a need exists for an alternative to traditional firearm training which addresses these concerns and maintains the overall benefit of live fire training.

SUMMARY

Hence, the present invention is directed to a dry fire training device and system for conducting and evaluating firearm training with a high degree of safety and accuracy, and which significantly reduces the wear and tear on the training firearm.

One aspect of the present invention relates to a multi-function dry fire training device to be inserted into the chamber of a firearm. The dry fire training device may include an illuminator, which upon receiving a command from a controller, emits a beam of at least one wavelength of visible and/or invisible illumination from the barrel of the firearm, the beam being parallel to its central axis. The dry fire training device also may include a controller to control the functionality (or operational modes) of the device including illumination of the illuminator, in response to pulling the trigger of the firearm by a shooter. The dry fire training device further may include an actuator, which is electrically connected to the controller, used to activate the controller whenever it is struck by the striker. The dry fire training device also may include a power source to provide DC power to the controller and illuminator.

The illumination beam may be comprised of at least one wavelength of IR, UV or visible light. The device further may comprise a collimator to focus the emitted beams on a target. The illuminator may include a light emitting diode that emits at least one wavelength of light or a laser diode that emits coherent stimulated electromagnetic radiation.

In one aspect, the training device may include a hollow body which comprises a first casing that includes a first securing mechanism for attaching and securing the first casing to a second casing. The device further may include a second casing to which an illuminator is attached. The second casing may be electrically connected to the first casing. Also, the training device may include an insulating sleeve, for readily preventing contact of the power supply with the first or second casing, and two spring-like biases situated at opposite sides of the power supply and on the long central axis of the dry fire training system, to prevent a disconnect when the striker strikes.

Another aspect of the invention relates to the actuator. The actuator may include a non metallic striking pad which is capable of sustaining a plurality of strikes by the striker, without being pierced. The actuator may comprise a conductive material which activates the control circuit, an energy absorbing material for dampening strikes, and a bell-shaped absorbent material with a conductive end pin to contact the face of the control circuit when the striker strikes.

The actuator may be constructed from at least one material sensitive to pressure, shock, or mechanical stress such as a piezoelectric material, so that the control circuit can distinguish when the actuator assembly is struck by the striker.

The actuator also may be constructed from at least one electronic sensor such as a vector or vibration sensor in a way that the control circuit can distinguish when the actuator assembly is struck by the striker. The controller may comprise a microcontroller or a microprocessor, for allowing exact control of the illumination time and delay time. In one aspect, the illumination time is 1-15 mSec.

In another aspect of the invention, the controller may be programmed to turn on the light with the first shot and turn off the light with the second shot, to align the sights and to implement a delay every several "shots," which simulate a magazine change.

In another aspect of the invention, the emitted light may carry digitally coded information that modulates the illumination of the light.

In another aspect of the invention, the illuminator may emit invisible wavelength to carry coded information, in addition to visible light.

In another aspect of the invention, the controller also may be used to record the device history data within a memory.

In another aspect of the invention, a group of programs is set to run and determine the functionality and different operation modes of the device.

In another aspect of the invention, the actuator may operate as a toggle switch to initiate changes in the operation mode of the training device.

In another aspect of the invention, the training device further may comprise (1) a communication port to communicate with the controller and the memory, to retrieve data, to set functionality programs, and (2) a collimator attached to, or integrally formed with the illuminator, to focus light and/or electromagnetic radiation emitted from the illuminator.

In another aspect of the invention, the control circuit may be biased using a standing flat spring.

In another aspect of the invention, the training device further may comprise an attachment element to secure the device to different barrel lengths using a locking mechanism and a retaining pipe assembly.

In another aspect of the invention, the training device may consist of a front part and a rear part, being detachable from each other, wherein different rear parts may include different functionalities and front parts may include different wavelength illuminators.

In another aspect of the invention, the retaining pipe further may comprise a threaded connection to allow connection of a modular extension and/or a reversible fastener.

In another aspect of the invention, one or more O-rings may be placed along the hollow tube, to prevent contact between the barrel and the hollow tube, while installing and using the tube.

DESCRIPTION OF THE DRAWINGS

The accompanying drawings, which are incorporated herein and constitute part of this specification, illustrate an embodiment of the invention, and together with the general description given above and the detailed description given below, serve to explain the features of the invention.

FIGS. 8A and 8B illustrate the construction of a retaining pipe with a reversible beveled fastener for insertion into the barrel of the firearm, according to an embodiment of the present invention.

DESCRIPTION

Figure 1:
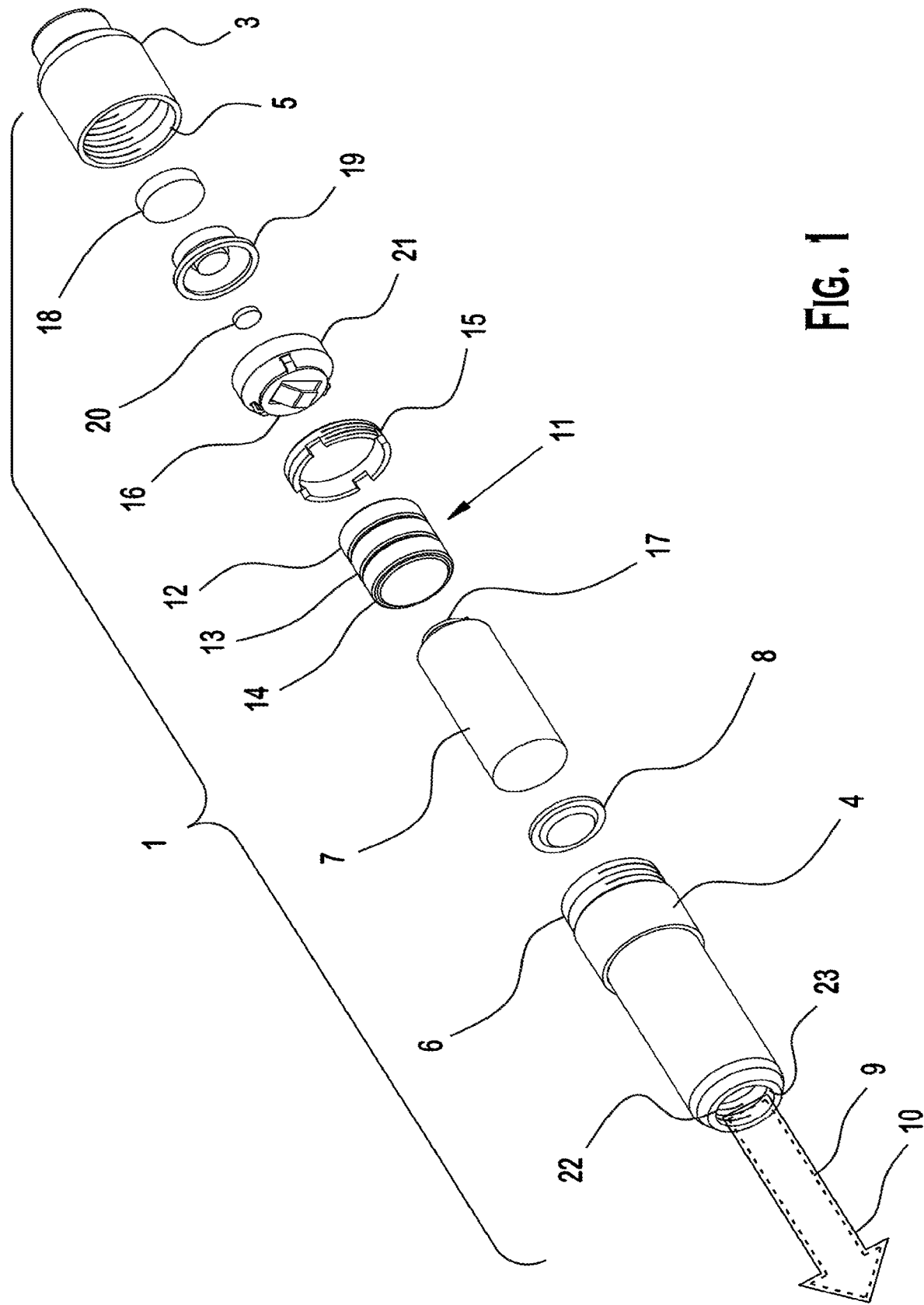
FIG. 1 shows an exploded view of a dry fire training device of the present invention.
Figure 2:
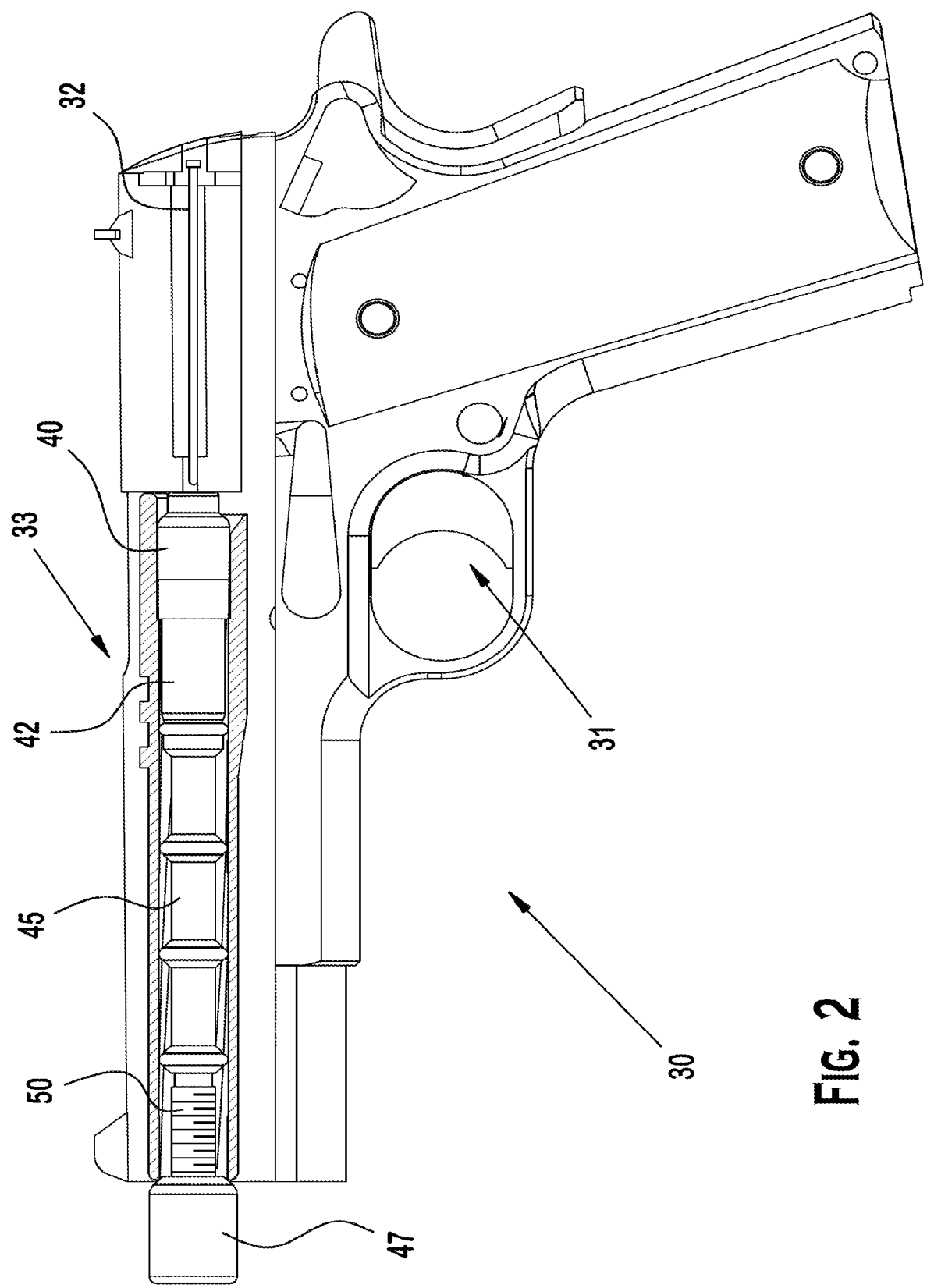
FIG. 2 shows a cross sectional view of a firearm with a dry fire training device and retaining pipe assembly, according to an embodiment of the present invention.

FIG. 1 shows an exploded view of an exemplary embodiment of a dry fire training device 1 of the present invention. FIG. 2 shows the dry fire training device 1 of FIG. 1 disposed within the chamber of a working firearm. In the embodiment shown in FIG. 2, the retaining pipe is generally disposed in the firearm barrel. One end of the retaining pipe is connected to the dry fire training device to align and secure the dry fire training device within the chamber. The other end of the retaining pipe is connected to a retaining member that is located primarily outside the firearm barrel. The retaining member connects to the retaining pipe and the firearm barrel to lock the retaining pipe and dry fire training device centrally within the firearm barrel to achieve a preferred operational configuration. Accordingly, dry fire training device 1 may be used while situated inside of, and in conjunction with, a handheld firearm 30, which includes a trigger 31, a striker 20 (e.g. a hammer driven firing pin, a spring loaded firing pin, or a static firing pin) and a barrel 33.

Referring to FIG. 1, dry fire training device 1 consists of a hollow body including a first casing 3 and second casing 4. First casing 3 includes a securing mechanism 5 for readily attaching and securing first casing 3 to second casing 4. Securing mechanism 5 can include a "screw top," quick coupling, coupler, fastener, threading or any other closure. The securing mechanism 5 may be a "screw top," a quick coupling mechanism, a coupler, or a fastener. First casing 3 has no "ejection rim" and therefore, dry fire training device 1 cannot be ejected out of the firearms while cycling the firearm or while racking the slide, defining dry fire training device 1 as rimless. Second casing 4 includes a complimentary securing mechanism 6 for readily connecting first casing 3 to second casing 4. Securing mechanism 6 connects first casing 3 to second casing 4. Dry fire training device 1 includes an illuminator 7, accommodated by second casing 4. Illuminator 7 is attached to, or integrally formed with, second casing 4 and is electrically connected to second casing 4. The connection may be a direct electrical contact between illuminator 7 and second casing 4. Illuminator 7 including collimator lens 8 may be disposed within second casing 4 to protect it from being scratched or damaged.

In one embodiment, illuminator 7 may include a light emitting diode for readily emitting at least one wavelength of light. For example, the light emitting diode may emit generally monochromatic "red" light and have a dominant wavelength between approximately 610 nm and 760 nm. In a preferred embodiment, the light emitting diode emits light between approximately 635 nm and 650 nm.

In another embodiment, the light emitting diode may emit generally monochromatic "green" light and have a dominate wavelength between approximately 500 nm and 570 nm. In one preferred embodiment, the light emitting diode emits light at about 535 nm.

In still another embodiment, the light emitting diode may emit generally monochromatic "blue" light and have a dominant wavelength between approximately 360 nm and 480 nm. In yet another embodiment, the light emitting diode may emit generally monochromatic infra red light greater than 760 nm. In a preferred embodiment, the light emitting diode emits light between approximately 780 nm and 850 nm.

In yet another embodiment, the illuminator 7 includes a laser diode for readily emitting at least one wavelength of coherent stimulated electromagnetic radiation. Further still, it is contemplated that the illuminator may include an organic light emitting diode as a source of light for the dry fire training device.

Moreover, the exemplary and preferred emission spectra described herein in connection with illuminator embodiments that use light emitting diodes apply generally to any device or system that may serve an equivalent function in the dry fire training device. Thus, for example, illuminators using a laser diode, organic light emitting diode, or other light emitting device may be used to generate light at wavelengths described herein in connection with embodiments having illuminators based on light emitting diode technology. Further still, the illuminator may utilize any suitable device or method for generating emissions of light as long as the light producing technology provides emissions of equivalent or similar characteristics as the light emitting diodes described herein.

In addition, illuminator 7 readily may emit light in at least a first wavelength of light 9 or/and in a second wavelength of light 10. Thus, for example, the illuminator may emit "red" light at a wavelength of 635 nm and infrared light at a wavelength of 780 nm. The use of multiple wavelengths of light may provide valuable benefits for a user.

The visible indication of the impact point by using a visible wavelength is the driver of the user recognition and self correction process, which is one of the valuable benefits for a user of this device. Additional benefits can be achieved by using an array of electronic targets which may be interactive to the device indicating various results related to the performance of the shooter, such as accuracy under time constraints. Such electronic targets would be based on recognizing the light pulse (signal) from the surrounding environment (noise). This task is substantially more difficult in an environment in which the signal is close in nature to the noise, such as a flash of a red dot of light in full sunlight. Therefore, emitting an IR (infrared) focused overlapping light from the dry fire training device 1 will substantially improve the ability to construct an "outdoor target."

Another feature of the dry fire training device 1 is the use of a dual wavelength emitter (both visible and invisible light), thereby allowing visual recognition of the light and enabling a standard "outdoor" censoring.

Dry fire training device 1 includes a power supply 11, which is electrically connected to illuminator 7. Power supply 11 may be situated adjacent to illuminator 7 for readily powering it. Power supply 11 includes at least one battery 12, such as an alkaline battery, a rechargeable battery, a silver oxide battery, a lithium battery, a lead acid battery, a mercury free battery, an ISO 14000 compliant battery, or a lead free battery. Preferably, the power supply 11 provides between approximately 1.5 volts and 6.0 volts of power. Most preferably, the power supply provides about 4.5 volts of power.

Optionally, power supply 11 is substantially contained within an insulator 13 for readily preventing contact of power supply 11 with the second casing 4 and/or first casing 3 and/or securer 15, so as to avoid "short circuit." Power supply 11 may be situated between two spring-like biases 16 and 17 situated at opposite sides of the power supply 11 and on the long center axis of the dry fire training system 1. This will allow the power supply 11 to move when the firing pad 18 is struck by a striker without the risk of disconnecting the power supply from the circuitry of the dry fire training system 1. Power supply 11 also may be, or integrally formed with, a capacitor 14.

Figure 3:
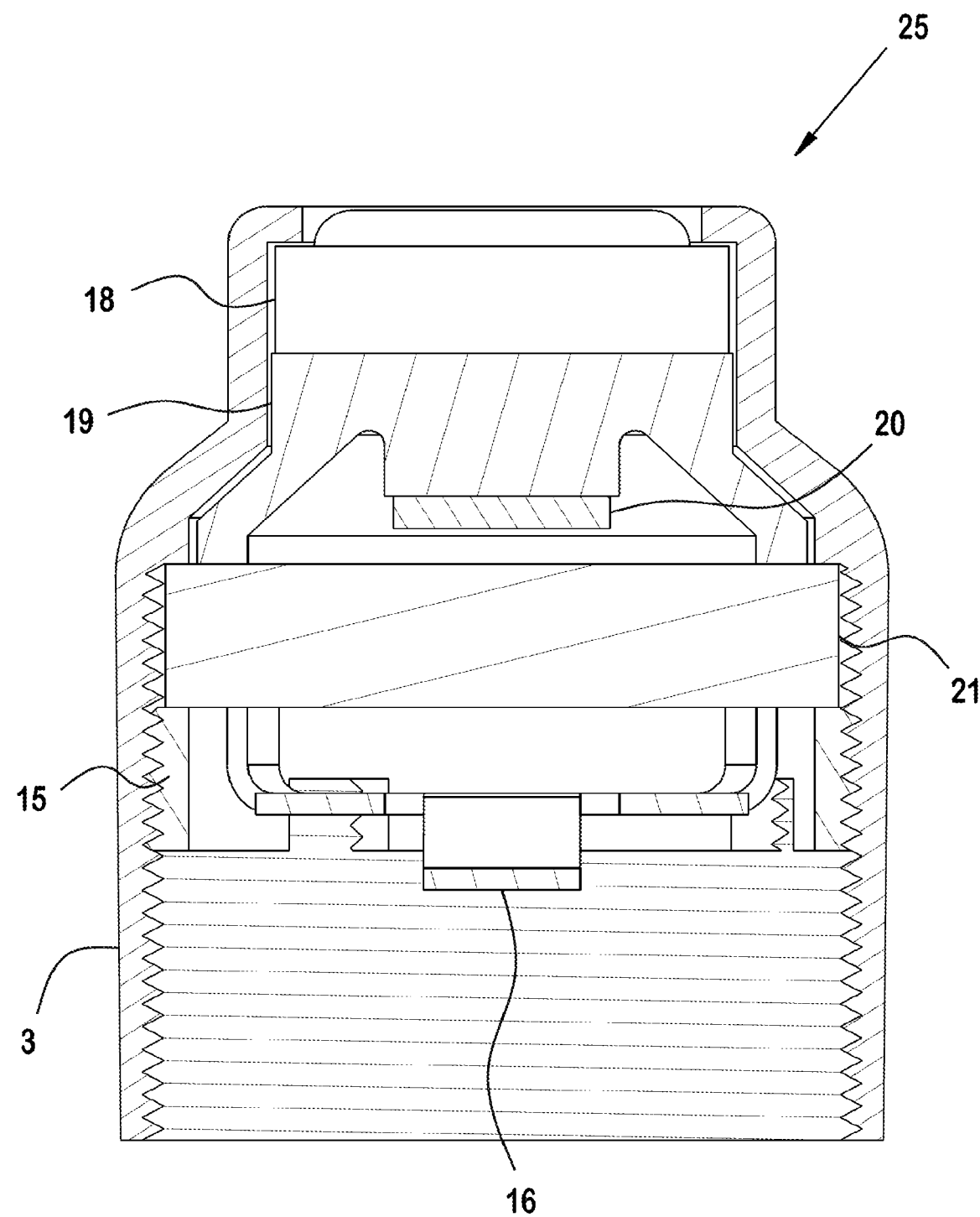
FIG. 3 schematically illustrates the structure of an actuator assembly used in the dry fire training device, according to an embodiment of the present invention.

FIG. 3 schematically illustrates the structure of an exemplary actuator assembly 25 used in the dry fire training device 1 of the present invention. As depicted in FIG. 3, dry fire training device 1 may include an actuator assembly 25, which consists of a conductive material 20 such as conductive rubber, an energy absorbing material 19, and a firing pad 18.

Energy absorbing material 19 may be a rubber energy absorbing material, a silicon energy absorbing material, or a vulcanized energy absorbing material.

Firing pad 18 may be constructed from a resilient material readily capable of sustaining a plurality of strikes by a striker, without substantially degrading the physical properties of striking pad 18 and/or being pierced by the striker.

Preferably, actuator 25 acts both as a damper to the striker and as the "trigger" for a control circuit 21.

In another embodiment, actuator assembly 25 may be constructed of at least one piezoelectric material such that application of mechanical stress and/or pressure on actuator assembly 25 generates sufficient electric current to be distinguished by the control circuit 21.

In yet another embodiment, actuator assembly 25 may be constructed of a non-conductive material, such that electricity and/or electric polarity is produced when the non-conductive material is subjected to pressure or strain sufficient to be distinguished by control circuit 21.

In yet another embodiment, actuator assembly 25 may be constructed of a pressure sensitive material, such that conductivity of the pressure sensitive material is achieved subsequent to pressure or strain applied to pressure sensitive material sufficient to be distinguished by control circuit 21, which readily detects a change of conductivity substantially consistent with striking actuator assembly by a striker.

In yet another embodiment, actuator assembly 25 may be constructed of at least one electronic sensor such as a vector or vibration sensor to be integrally formed with control circuit 21 such that the control circuit 21 will be able to receive the digital information transmitted from an electronic sensor and to distinguish when the actuator assembly is struck by the striker.

In use, actuator assembly 25 simulates a firearm primer and may be further constructed of such materials, so as to substantially reduce impact of the striker striking actuator assembly 25 upon control circuit 21. For instance, actuator assembly 25 may be constructed of a resilient material and may have a mass conducive to energy transfer to actuator assembly 25, such that only subsequently to the striker striking actuator, assembly 25 has sufficient energy imparted to be distinguished by control circuit 21. For example, in a preferred embodiment, the actuator 25 will not impart a distinguishable signal to control circuit 21 as a result of racking the slide of the handgun.

By contrast, activation of the functionality of the dry fire training device 1 may be accomplished by the actual hit of the striker on the firing pad 18 of actuator 25, which in turn transfers the forward movement pressure to the entire upper surface of the bell-shaped absorbent material 19.

In an exemplary embodiment, the pressure deforms the bell-shaped absorbent material 19 to collapse toward the control circuit 21, while absorbing the force of the impact of the striker. The bell shape of this part, enclosed within first casing 3, transfers the pressure applied on it toward the outer supporting rim of the control circuit 21, thus avoiding direct impact on the control circuit. Adequate pressure and movement will bring the conductive end pin 20 located within the bell shaped absorbent material 19 to contact the face of the control circuit 21 containing conductive strips which are part of the electronic circuit, which is monitored by the microcontroller on the control circuit. Once the conductive end pin 20 touches more than one conductive strip, an electrical circuit is closed momentarily to be identified by the microcontroller which in turn, activates the functionally. Furthermore, the conductive end pin 20 acts as a restrictor to the collapsing movement of the bell shaped absorbent material 19 thus restricting the inward movement of the striker in a manner similar to a real primer.

Preferably, the striking pad 18 is made of a non-metal material to avoid a process which could occur in metal by the striker known as "shot peening". Shot peening produces a compressive residual stress in the metal, resulting in a hardened surface that may damage the striker. Additionally, since the dry fire training device 1 is designed to be a commercial item, introducing a non-metallic part serves the purpose of defusing worries regarding the potential damage to one's weapon.

In a preferred embodiment, striking pad 18 is constructed of a resilient material, such as a technical plastic reinforced by glass or carbon fibers, that is readily capable of sustaining numerous strikes by a striker without substantially degrading the physical properties of striking pad 18 and/or being pierced by the striker. This activation method provides two advantages:
- Eliminates "misfires" which are common to the vibration activated designs while holstering, racking, handling, hitting a surface and more, and
- Actuator 25 acts as a "snap cap" (A snap cap is a device which appears similar to a standard firearm cartridge but contains no primer or projectile and is used to dry fire the weapon. Snap caps usually contain a spring-dampened false primer which absorbs the force from the striker allowing the user to safely test-fire the gun without damaging the components) which protects the weapon's ability to remain intact, in some model handguns, by preventing weakening and possible breakage of the striker and increased wear to other components.

Dry fire training device 1 may include a collimator 8 attached to, or integrally formed with illuminator 7, which is situated adjacent to illuminator 7 for readily focusing light and/or stimulated electromagnetic radiation passing through collimator 8. Collimators 8 of different characteristics can be used as known in the art for producing alternate focusing and/or collimating properties of illumination emitted from illuminator 7. Collimator 8 focuses and/or collimates illumination passing through collimator 8 into a substantially focused area. Preferably, the focused area of illumination is substantially between 0.01 and 0.1 cm in diameter when illuminating at a distance of 10 meters.

Collimator 8 focuses and/or collimates illumination passing through collimator 8 into a substantially focused area. Preferably, the focused area of illumination is substantially between 0.1 and 1.0 cm in diameter when illuminating at a distance of 10 meters.

The laser collimator structure is regularly cylindrically shaped with the emitter placed into one end and the lens at the other end at a fixed distance. The emitter is mounted on a PCB (Printed Circuit Board) and is centered at one end of the cylindrical collimator. The lens is mounted in the collimator at the opposite side from the emitter.

There are a few traditional ways to set the lens. The lens may be pressed against the inside of the collimator end by using a spring between the emitter and the lens. The lens may be enclosed within a threading and the position set with glue. Or, the lens may be set using a rubber or plastic retainer.

Figure 4:
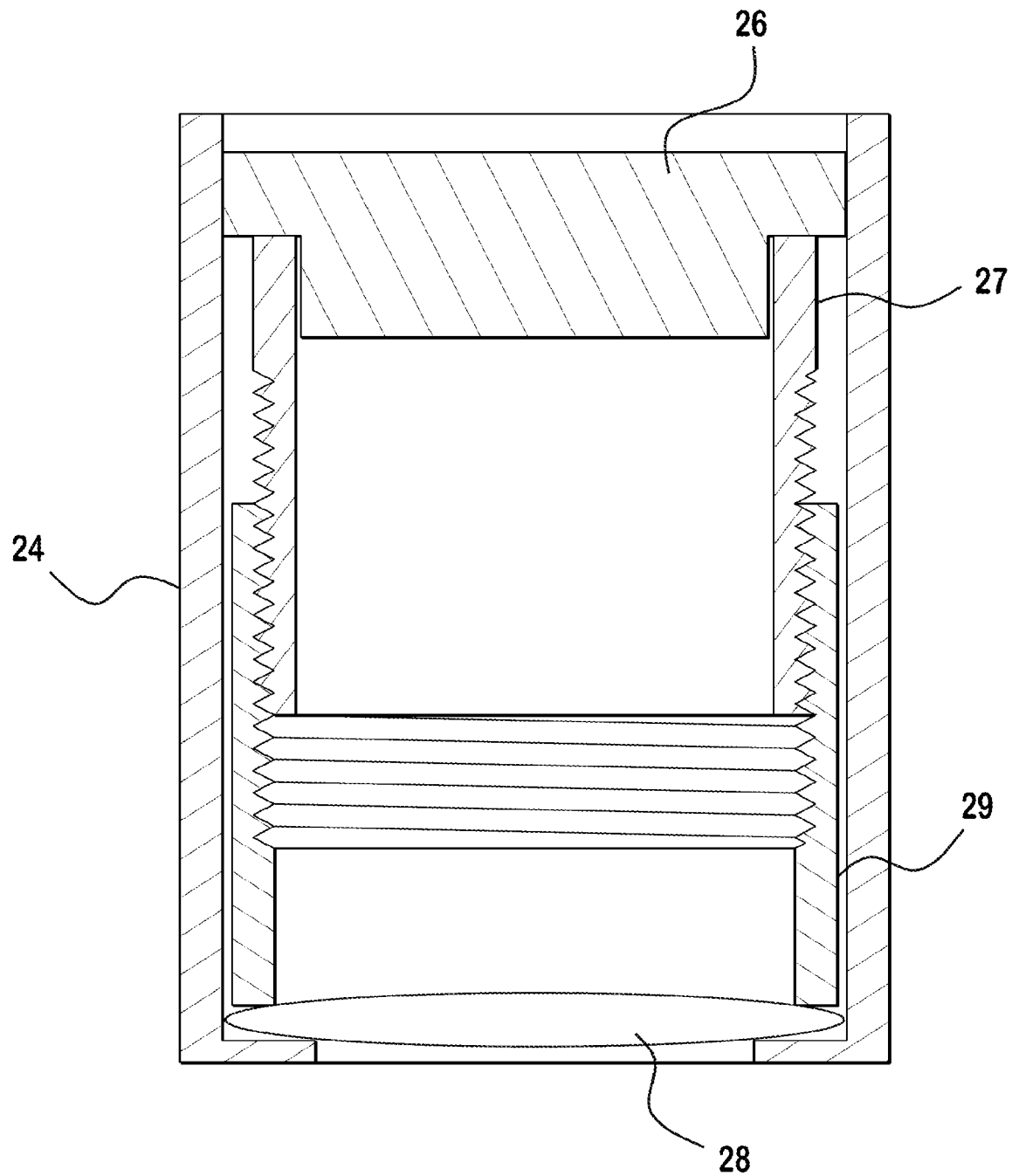
FIG. 4 schematically illustrates the structure of a collimator used in the dry fire training device, according to an embodiment of the present invention.

FIG. 4 schematically illustrates the structure of the chosen collimator 8. The emitter 26 is placed at one side of the collimator, in the middle of a cylindrical base 27 with an outer threading. A glass lens 28 is mounted and glued to the end of a second cylindrical part 29 which has an internal threading. Both parts are screwed together 27, 29 while the emitter 26 and lens 28 at opposite sides, to create the collimator 8.

Focusing is achieved by screwing both parts together until the correct height is achieved and then glued to prevent movement. The entire collimator 8 then is enclosed within a wrapping sleeve 24 and the electronic board casted in resin. Advantages gained by using this arrangement include:

Lens stability: Since the lens is firmly glued to the adjustable collimator part and the part is glued to the collimator base, there is no possibility for the lens to move (unlike a spring mounted lens, in which the lens can simply be pushed in). Therefore, the laser does not lose the focal point or alignment when hit or touched (for example, during cleaning). Because the lens cannot be pushed in or move at all, it is vibration resistant—an important feature for the durability of the dry fire training device.

The mounting/gluing of the lens requires a small surface on the circumference of the lens leaving the lens almost free of obstructions. This enables a large aperture to utilize a larger amount of the light emitted from the laser emitter into the beam, in contrast to the example in which the lens is enclosed within a threading, leaving only a small surface of the lens unobstructed.

The laser module is sealed from the PCB side by resin and from the lens side by the glued lens, making it liquid proof unlike other type of laser modules. This feature is desirable, since the device is likely to be exposed to various liquids and substances.

The glass lens provides the ability to resist solvents and corrosive materials and the ability to maintain accurate collimation at a wide range of temperatures.

The accumulation of the above features in one collimator/laser module makes it well suited for usage in the dry fire training device.

Returning to FIG. 1, a securer 15 secures control circuit 21 between securer 15 and first casing 3 thereby readily securing control circuit 21. Securer 15 is attached to first casing 3 with securing mechanism 5. The dry fire training device may be controlled by a control circuit 21, which comprises a microcontroller. The use of a microcontroller enables the control of exact illumination and delay time, as for complex multi functionalities brought forward for example purposes:

1. Delay: a desired delay is set between the time of hitting the striker and the illumination of the laser module. The microcontroller "recognizes" the striker strike and "waits" a predetermined time period before activating the laser module. This feature is needed, since a striker mechanism creates a vibration pulse through the firearm from the time of "striking" the device in the chamber and up to a short time after. Attempting to cerate a steady visual mark at that time span on a "target" by illuminating a focused visible light will result in a blurry/fuzzy mark. By introducing a delay between the striker strike and during the vibration pulse, and illuminating only after the vibration pulse is over, a coherent mark is achieved by the illumination. This delay can be set to simulate the actual time it takes a real bullet to leave the barrel, thereby enabling the better simulation of real ammunition.

2. Controlling the Illumination time: when a firearm is used, it is constantly being moved by the user, intentionally or not. Even with experienced shooters, after pulling the trigger, a movement may be noticed. This may extend the time period, in which a real bullet may have already left the barrel. Therefore, a prolonged illumination time may result in a line rather than a dot mark. On the other hand, an illumination pulse which is too short will not be visible enough to be recognized by the shooter. Therefore, it is important to control the illumination pulse, in order to achieve the best results. For this matter, the optimum illumination time is 10-15 mSec.

3. Changing illumination time: with regard to the above, there are advantages for a longer pulse of light. By lengthening the pulse of light emitted from the device, it can be used as a diagnostic tool to recognize shooting technique errors or for stability training. As discussed above, movement of the firearm while shooting the device with a long time pulse will result in a short line rather than a rounded dot mark. The line's length and direction indicates the nature of the movement of the shooter while operating the firearm (e.g., due to instability, trigger slapping, trigger pull etc.) and can be used to improve the shooter's skills.

4. Various functionalities: the controller can be programmed to a various range of functionality differing from simple pulse illumination. For example, the device can be set to turn on the light with the first shot and turn off the light on the second shot—such functionality is equivalent to a "bore sighting" device which is used for aligning the sights. Another example is a program that incorporates a few seconds' delay every several "shots," to simulate a magazine change due to lack of ammunition.

5. User ID and system interface: Digitally coded information can be transmitted by modulating the illumination of the light. A simple binary code can be implemented simply by turning the emitter on and off within a single pulse. For example, this code can be personalized per device, resulting in a unique ID per device which is recognizable by an electronic target. This ability also can be utilized by interfacing to a simulator system to encode and enable the usage of the device within such a system.

6. The ability to control multi wavelengths: the different "lights" can be activated and deactivated according to different functionalities needed:
   a. The invisible wavelength is always on and the other wavelength light is activated only when the weapon is "shot" (both can carry information, such as an ID code). This can be used to analyze the "shooters" behavior and movement.
   b. The visible light is activated only when "shot;" the invisible light is activated at the same time and can carry information, such as an ID code.
   c. Only one wavelength is activated according to "mode" or the program running in the microcontroller.

7. Practice History: the microcontroller records the dry fire training device history within the memory storage. This is used to record data, such as usage, manufacturing info, personal ID or the number of "shots" used. This can be used to recognize the unit, study its usage history or control the life time of the device 1.

8. Operation mode: utilizing the same memory as mentioned above, a "working mode" or program out of a set of more than one program can be set to run and determine the functionality of the device 1. For example, control circuit 21 may contain five different operation modes or programs. An area in the memory will be read by the microcontroller during the operation of the current functionality to determine the rest of the behavior of the device. Additionally, accessible changeable parameters can be set in the memory, to determine functionality related operation, such as illumination and/or delay time.

9. Toggle switch: one of the possibilities of operating the above device is utilizing the actuator as a toggle switch. Holding it down for a time longer than a regular striker hit can initiate a program that changes and sets the operation mode. For example, after holding down the actuator for more than one second, the program will initiate the change of the operation mode and will indicate by flashing the illuminator. It will start by flashing the current mode (three flashes for mode three) and will counting with interlaps to indicate the new mode. One flash—mode one, two flashes—mode two and so on. The device will remain in the last mode initiated before the user releases the actuator.

10. Communication: by using a communications port, it is possible to communicate directly with the microcontroller and the memory storage. Communication allows retrieving or setting a new ID, changing functionality, retrieving history, retrieving or changing variables, retrieving or changing manufacturing information, retrieving or changing functionality program, and more.

Figure 5A:
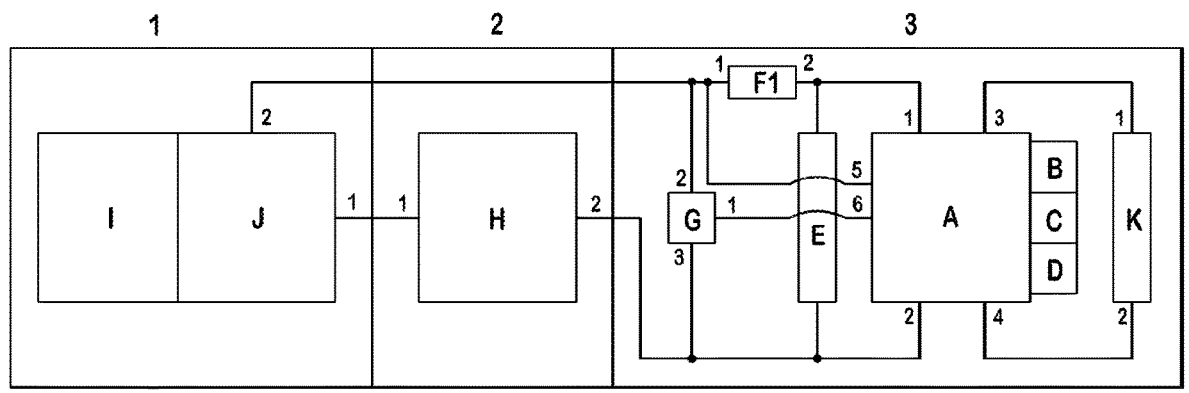
FIGS. 5A, 5B and 5C show exemplary embodiments of the electronic circuit of the dry fire training device, according to an embodiment of the present invention.
Figure 5B:
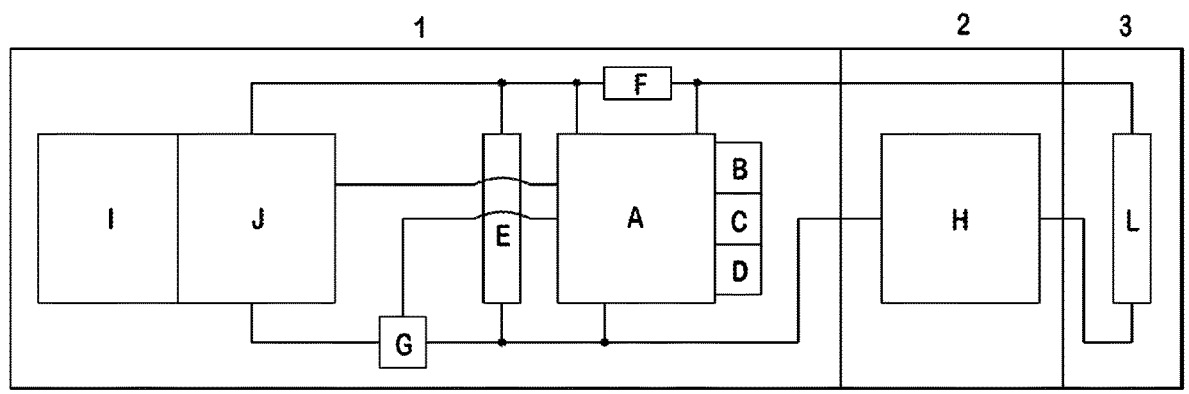
Figure 5C:
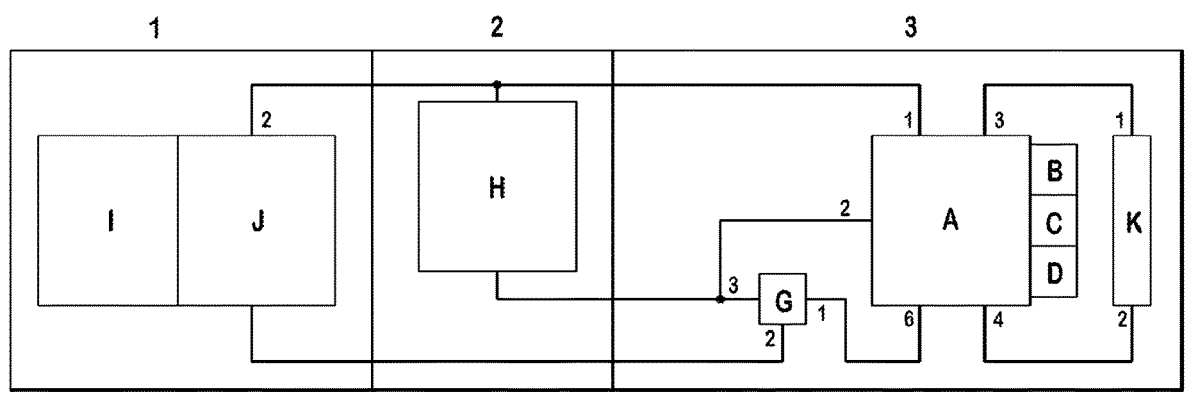

FIGS. 5A to 5C show possible implementations of the electronic circuit of the dry fire training device. In FIG. 5A, the device is divided into 3 logical sections, detailed as numbering 1, 2 and 3. Section 1 contains the illuminator I and illuminator control circuit J. Section 2 contains the power supply H, and section 3 contains the control circuit for the functionality of the device and the actuator. The logical sections are noticeable in the physical structure of the device.

The relay G, preferably implemented by a MOSFET, has at least 3 connected ports numbered 1, 2 and 3. Port #1 is used to control the opening and closing of an electrical connection between ports #2 and #3. The relay G will be set to be in its open state (no connection between ports 2 and 3) in the idle position of the device. In this position, the microcontroller A is shown in FIG. 5A. Port 2 of the microcontroller is connected to one pole of the power supply and port 1 is connected to second pole of the power supply via the illuminator control circuit J, which at this point is connected to only one of the power supply's poles, the one way electrical conductor F, preferably a diode, is allowing the electrical current into the microcontroller A and may be placed on one of the lines connected to the microcontroller A through ports 1 or 2. In addition, the rechargeable power supply E, preferably a capacitor, is connected to the power supply H and is charging or has been charged. During this position, the microcontroller is carrying out the set of instructions (preferably a computer program) which is stored in the program memory B and waiting for an indication from the electronic indicator K or by port 3 or 4. In the event the actuator is struck by the striker of a weapon, the electronic indicator K provides an indication that is recognized by the microcontroller A. The indication can be one of several possible indications recognized by the microcontroller, including but not limited to: a momentary connection, specific timed connection, disconnection, specific timed disconnection, an increase in conductivity, decrease in conductivity, electrical surge, reverse polarity or a data signal. In order to recognize some of the indications, the microcontroller may require an additional component, such as a vector sensor. The microcontroller A then will proceed to carry the set of instructions from the program memory B suitable to the type of indication from the electronic indicator K. In the event of carrying out an instruction to illuminate the illuminator I, the microcontroller will control the relay G by using port 6 of the microcontroller A to be in its closed state (direct connection between ports 2 and 3), thereby completing an electrical circuit to the Illuminator control circuit J, which in turn supplies power to the illuminator I, which illuminates. The control over the illuminator I is achieved by opening and closing the relay G using the microcontroller A.

During the time when the relay G is closed, the microcontroller A cannot draw any power from the power supply, since the direction of the electrical current has now been changed. Instead, the microcontroller A draws the needed power from the rechargeable power supply E. The one way electrical conductor F restricts the reverse current from reaching both the microcontroller A and the rechargeable power supply E. This design allows using the outer casing body and a single connection to the power supply to be the sole electrical contact of both the control circuit J and the illuminator I to the power supply although situated at opposite sides of the power supply and require opposite current, in order to operate.

FIG. 5B illustrates another possible construction. In this construction, section 1 contains the illuminator I, illuminator control circuit J and the control circuit for the functionality of the device. Section 2 contains the power supply H and section 3 contains the switch L. This architecture enables combining the illuminator control circuit J with the control circuit for the device 1. The current is channeled through the switch L from the power supply to the conducting body of the device and to the control circuit J. When the actuator is struck by the striker, the switch L will momentarily disconnect the current to the microcontroller. During the momentary disconnection of the current by the switch L, the control circuit operates by using the power stored in the rechargeable power supply. The control circuit recognizes the drop in power in port 3. The microcontroller A then will proceed to carry the set of instructions from the program memory B. It is also possible to accomplish such functionality without using a rechargeable power supply. The microcontroller will stop working as the current drops and will utilize the "reset" feature to execute a set of instructions as it "wakes up" when power returns.

FIG. 5C illustrates an architecture, in which an additional conductor is added between the power supply and the microcontroller. This architecture overcomes the previously described limitation, according to which the microcontroller and illuminator cannot draw power from the power supply at the same time.

Thus, almost all training scenarios can be realistically replicated safely and trained for many uses, including but not limited to law enforcement scenarios, military scenarios, sport scenarios, IPSC scenarios, marksmanship scenarios and the like.

A control circuit bias 16 is situated between control circuit 21 and power supply 11 for readily dampening energy from the striker and for readily situating power supply 11 to control circuit 21. Control circuit bias 16 is geared toward conductively closing an electric circuit with power supply 11 and control circuit 21.

Figure 6A:
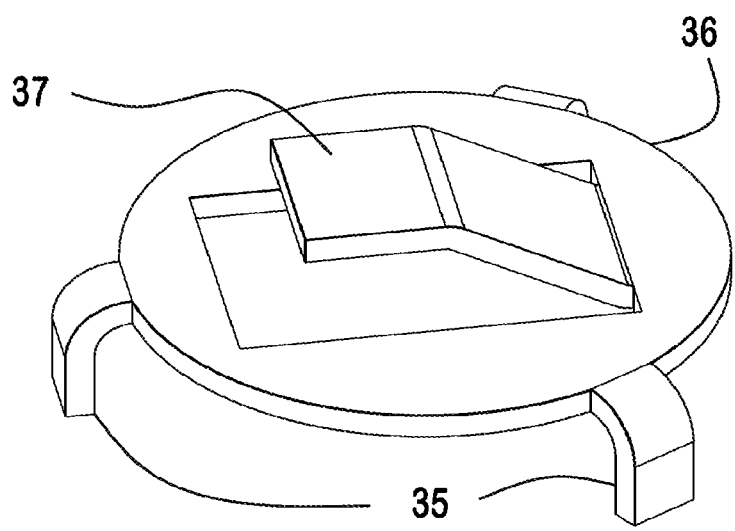
FIGS. 6A, 6B and 6C schematically illustrates the structure of a standing flat springs for biasing between the control circuit and power supply according to embodiments of the present invention.

Control circuit bias 16 includes a standing flat spring as shown in FIG. 6A, which offers a solution to a range of situations, in which there is a limitation of diameter size, space size, height, and place on the board or other production needs where miniaturization is needed. By using the standing flat spring, it is possible to utilize the limited free space on a printed board and the limited height to be placed as a battery connector.

Figure 6B:
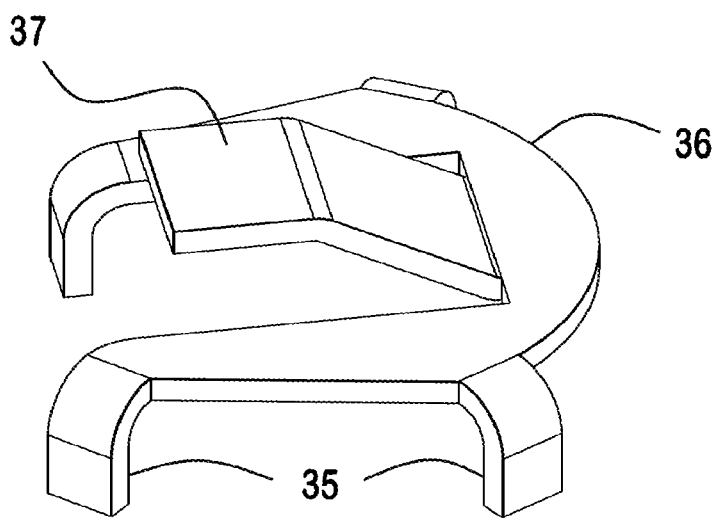
Figure 6C:
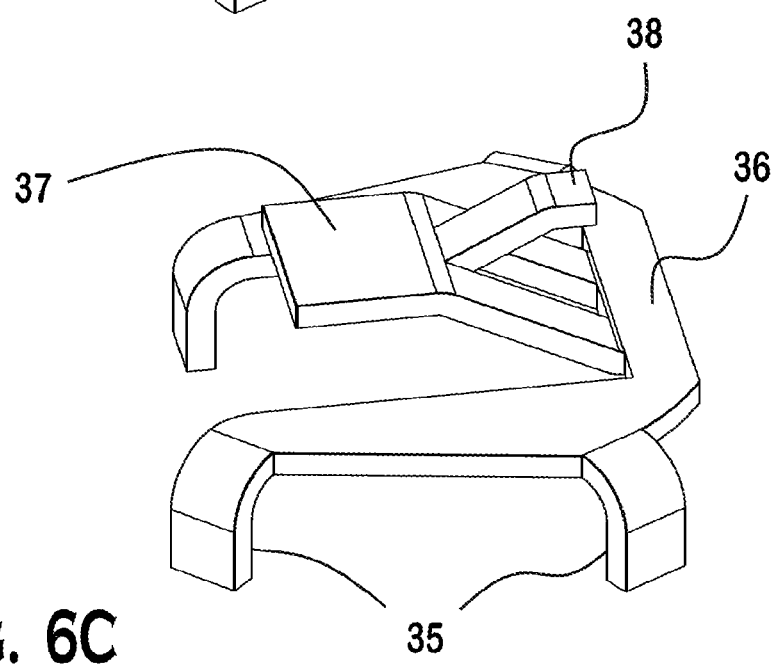

Advantages of the standing flat spring 16 over a regular spiral spring when used on a miniature PCB, as shown in FIGS. 6A, 6B and 6C include:

Easy soldering to the PCB: when soldering a spiral spring to a PCB, it is joined by soldering a section of the bottom surface of the spring to soldering pads upon the surface of the PCB. It is also common, in order to increase mechanical durability, to insert a straightened end of the spring through a premade hole in the PCB and to solder it at the base. Since the spring is not applied during the SMD process (unless manually placed), it is extremely difficult to solder the spring to the pads directly below the spring. The standing flat spring 16 connection is made with legs 35 which comply with soldering standards, thereby allowing simple and easy connection to the PCB.

The standing spring can be placed either by SMD or manually on the pads covered with soldering paste and go through the reflow oven for soldering. It is also substantially easier to manually solder the standing spring than a spiral spring to the board.

Uses minimal physical place on board: a spiral spring requires a surface the size of the entire spiral upon the PCB. This surface is further enlarged by the limitation of placing electronic components within a minimum distance of it. The standing spring 16, however, requires only the surface size of its legs 35 including the minimum distance needed times the number of legs 35. The minimum number of required legs 35 is three, thus using the surface space of merely three pads. The connection of the standing leaf spring to the board is strengthened by placing glue at the connection point of the leg 35 to the board. Gluing the legs 35 in this manner is possible, since the leg 35 height is not necessary for the function of the spring and the presence of the correct glue on the board will not interfere with the other components. In a collapsible spiral spring, any glue placed at the base will limit the ability of the spring to collapse.

Low profile with long working movement: Another electronic connection spring type that has a relatively small surface is known as a pogo spring. The standing flat spring 16, however, has a substantially increased movement span and strength than any miniature pogo spring. Furthermore, the pogo spring requires a minimum height limited by the height of the base of the pogo spring. The standing flat spring 16 height limitation is as the height of the legs 35 needed to elevate the spring leaf 37 above the components, in addition to the thickness of the material (which normally varies between to 0.5 mm) thus virtually having no height limitation. For example, the working movement of a standing flat spring 16 with a total of 2 mm height can easily be over 1 mm.

Component protective: By creating a sturdy surface 36 above the electronic components, the standing flat spring 16 buffers the components from the battery compartment and will not allow the battery or any other body to be pressed against the components. Furthermore, it is possible to cast resin up to the level of the standing spring's surface 36, thus preventing any access or possible damage to the components by an unwanted body.

Spring Strength: The standing flat spring 16 offers the strength of a leaf spring which, in order to be matched by a spiral spring, will require a much thicker wire than the thickness of the leaf spring.

SMD compatibility: By utilizing a balanced lifting point, the standing flat spring may be used in the automatic electronic assembly SMD process. This is achieved by simply placing the springs in a slotted surface which acts as a "magazine" and lifting them from the lifting point using vacuum tips commonly used in regular SMD machinery and placing them on the PCB for soldering.

Design flexibility of standing flat spring: As illustrated in standing flat spring shown in FIGS. 6A, 6B and 6C, the standing flat spring 16 can be designed for use in different PCB layouts with the ability to place different numbers of legs 35 of different lengths at different locations according to the needed limitations. The flexibility in the design allows utilizing the advantage of the small PCB surface space needed to mount the spring in different PCB layouts and sizes. An additional flexibility in the design is demonstrated in FIG. 6C, in which the means of extending the height and movement of the standing flat spring 16 is demonstrated by extracting a leaf spring 38 out of the surface of a "base" leaf spring.

Figure 7:
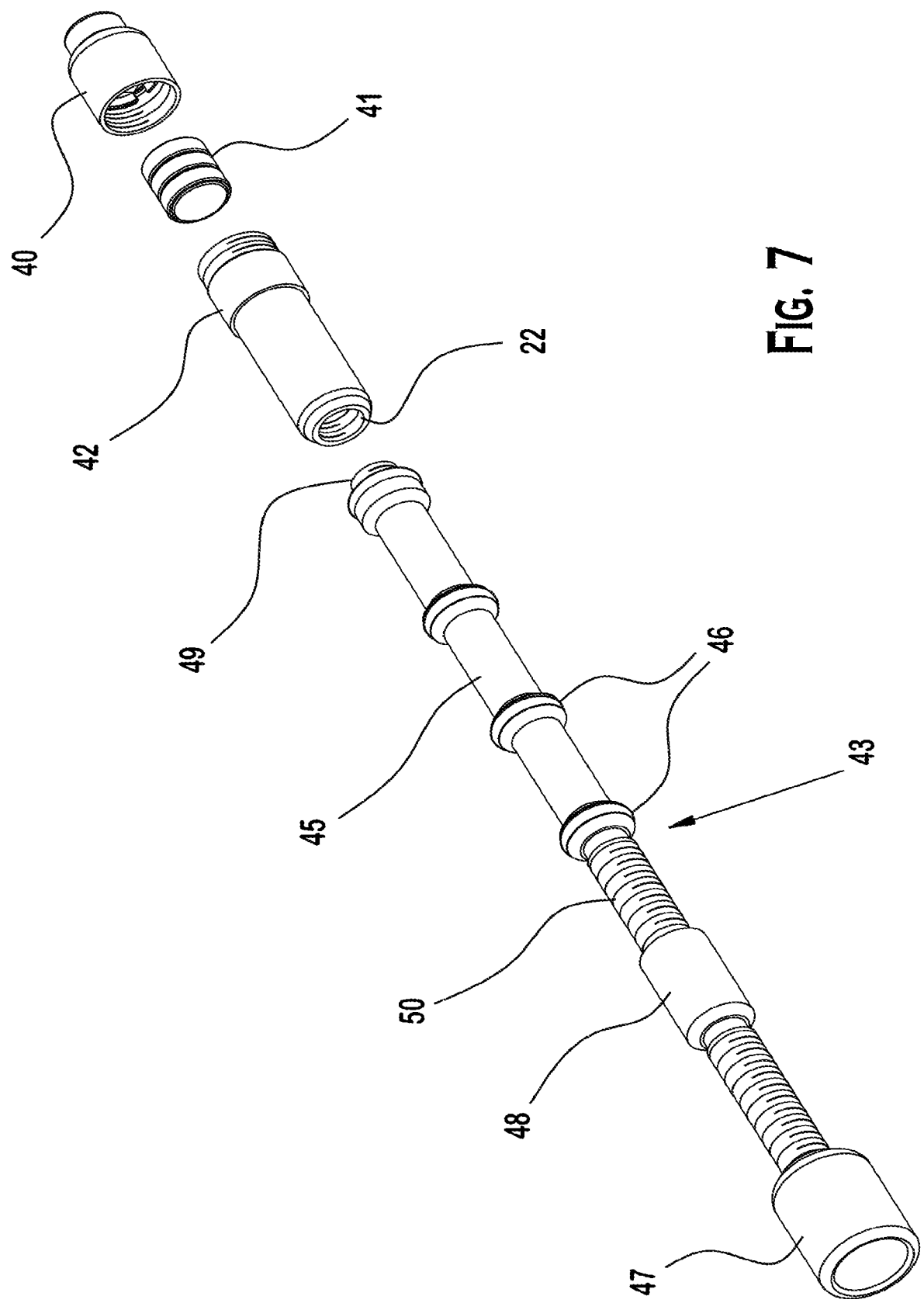
FIG. 7 shows the construction of four separate and autonomous bodies of the dry fire training device according to an embodiment of the present invention.
Figure 9:
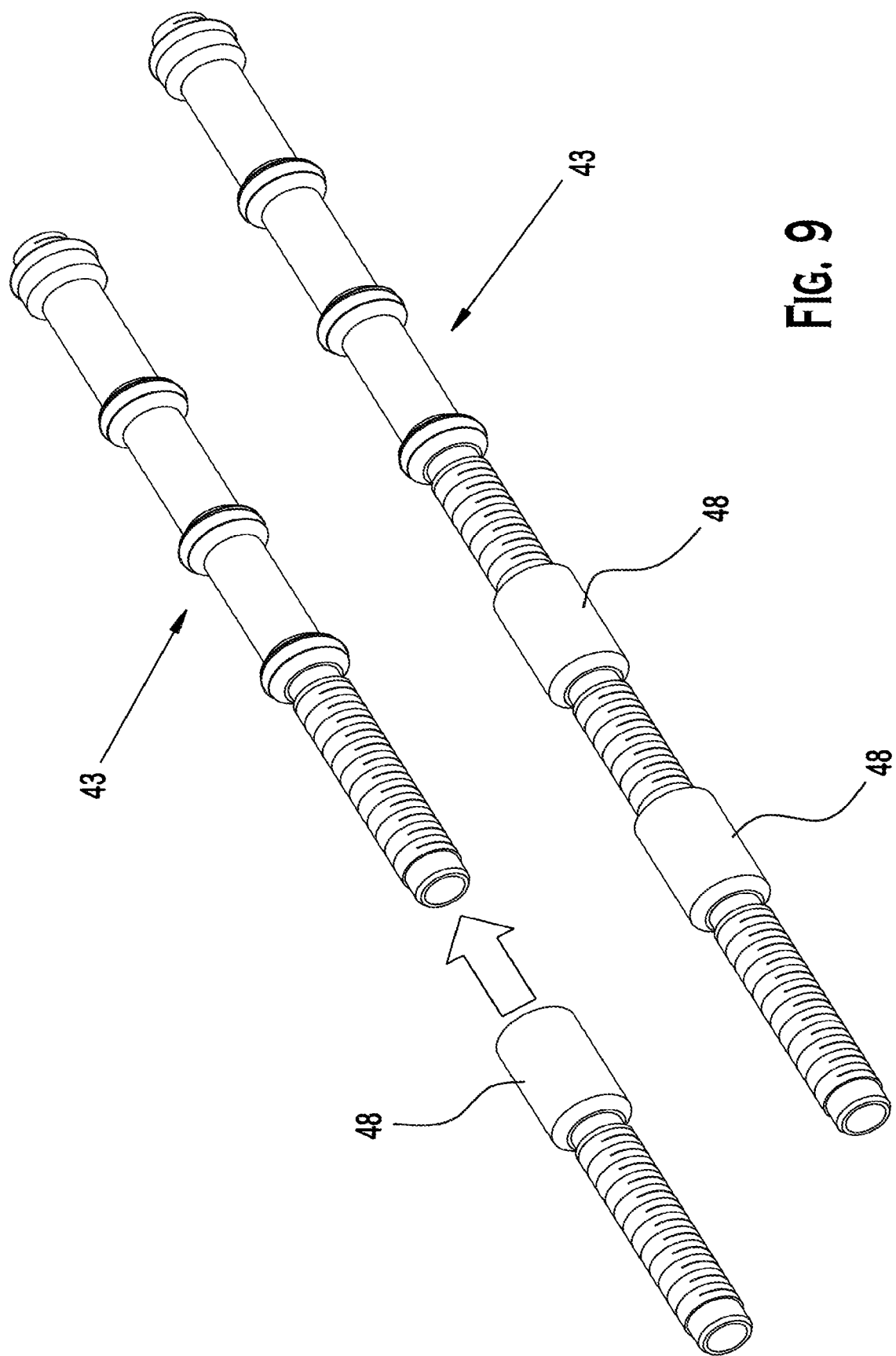
FIG. 9 illustrates the construction of a retaining pipe and modular extension assembly, according to an embodiment of the present invention.

The dry fire training device 1 may be constructed out of four separate and autonomous bodies, as shown in FIG. 7:

1. The front part 42 which includes a casing containing the emitter and collimator and lens.
2. The rear part 40 which includes a casing containing the electronic control circuit, firing cap, and actuator.
3. Power supply 41.
4. Retaining pipe assembly 43, which includes a retaining pipe 45, a fastener 47 and, if needed, one or more modular extensions 48.

This foregoing structure enables the following functionality:

1. Enabling replacement parts: The front 42 and rear parts 40 are detachable from each other, thereby allowing replacement if needed. Different rear parts 40 may include a variety of different functionalities by merely introducing different programming in them. Thus, changing the functionality of the device is achieved by merely replacing one rear part 40 with another. Due to the nature of operation of this device, in which a striker repeatedly strikes the firing cap situated in the rear part 40, the rear part 40 is exposed to mechanical wear or can be digitally limited to a number of "shots." Therefore, the ability to replace this part provides a high benefit to the user. Such rear part 40 could be also be integrally formed with the power supply 41, thus changing the part will have the benefit of replacing the power supply, as well. On the same basis of replace ability, the front part 42, the emitter could be replaced to provide a wide range of wavelengths or other specialty.

2. Enabling the replacement of the power supply: The power supply 41 can be easily replaced by separating the front part 42 from the rear part 40 and removing the power supply 41 to be replaced or recharged.

Optionally, dry fire training device 1 may be attached to, or integrally formed with an attachment element 22 for readily attaching a variety of attachments to dry fire training device 1 to readily enable securing dry fire training device 1 in at least two firearm barrel lengths and/or adding a locking mechanism and/or a safety attachment to the end of dry fire training device 1. Attachment element 22 is selected from the group consisting of: a quick coupling attachment, a tapped attachment, a screw-on attachment and a snap-on attachment. Optionally, attachment element 22 includes an indicator 23 responsive to attaching accessories to the dry fire training device 1 with attachment element 22 thereby indicating the presence of accessories attached to the attachment element 22. Optionally, indicator 23 is a micro switch.

Referring to FIG. 7, retaining pipe 45 may be connected to attachment element 22 with the ability to connect modular extensions with attachment 50. Retaining pipe 45 ends with an attachment element 50 to accommodate a reversible beveled fastener 47. Optionally, the dry fire training device 1 is integrally formed with retaining pipe 45 long enough to protrude out of the front end of the barrel and contains threads or another way to connect a fastener.

FIGS. 8A and 8B illustrate the construction of the retaining pipe assembly with a reversible beveled fastener 47 to be inserted into the barrel of the firearm. With the basic functionality and appearance of a retaining nut, the fastener 47 has a through threading crossing the center. Additionally, both sides of the fastener 47 are beveled in an inward angle 51, 52 and the fastener 47 body is hollow on one side 53. The fastener may be installed on the retaining pipe 45 from both sides of the fastener 47, resulting in the ability to increase the range of suitability to different lengths of barrels—as demonstrated in the drawing by length A, B. The beveled end of the fastener 47 serve the purpose of self centering the retaining pipe 45 in a barrel 33, as the fastener is tightened into place against the barrel 33 end.

As best shown in FIGS. 2 and 7, O-rings 46 may be placed on the retaining pipe 4 in order to prevent contact between the barrel 33 and the retaining pipe 45 while situated inside a barrel 33. This served the purpose of preventing any damage both to the retaining pipe 45 or the barrel 33, in which it is installed. Also demonstrated in the drawing, is an O-ring 49 installed at the end of the retaining pipe 45 near the connecting threading to the dry fire training device 1. This O-ring 49 will prevent the self tightening and eventually the partial locking of the retaining pipe assembly 43 to the dry fire training device 1 as a result of the vibrations the handgun creates while using the dry fire training device 1. When assembled as described above, the retaining pipe assembly 43 is used to hold the dry fire training device 1 firmly in place in the firing chamber of a firearm and provides the following usages/functionality:

1. Safety: fail safe device—locking the laser bullet in the chamber will prevent accidental loading of a live round into the chamber. This feature allows a wide range of practice drills including magazine changes.

2. Safety visual indication: the safe nature of a firearm with a locked laser bullet in the chamber is visually indicated by the external retaining fastener.

3. Improve/ensure alignment: the retaining pipe assembly pulls the laser bullet against the cone shaped chamber and forces the bullet to be flush against the inner end of the chamber on one side and the beveled fastener on the other side. This will eliminate any tolerance which is necessary for the easy insertion and extraction of the laser bullet. This enables a high level bore sighting alignment.

4. Eliminate mechanical "exemption": same as 3 eliminates the phenomena of vibration of the laser bullet immediately after being hit by the striker thus helps to eliminating the phenomena of an unclear dot shape laser projection.

5. Hold in place: in conjunction with the absence of the ejection rim, enables practice drills that involve racking of the slide. Since the laser bullet is firmly held into place, it will not slide out or move from the chamber. Furthermore, there will be no attempt to eject the laser bullet since it lacks an ejection rim.

6. Fits all lengths: the retaining pipe will generally fit any barrel 33 length from 3" and longer by using the reversible beveled collate and modular extensions. More particularly, one end of the retaining pipe 45 is configured and dimensioned to attach to the dry fire training device 1 and the opposite end is configured and dimensioned to connect to the exterior retention member 47. Most preferably, the length of the retaining pipe 45 is sized to fit firearm barrel lengths ranging from approximately 2.8 inches to approximately 4.1 inches. In order to accommodate certain firearm barrel lengths, however, the opposite end of the retaining pipe 45 may require one or more modular extensions 48 as previously described. In one embodiment, each installed modular extension increases the effective length of the retaining pipe assembly by about 1 inch.

There are additional ways to keep the "bullet" in the chamber. For example:

1. A magnetic assembly may be used to fix the dry fire training device 1 in the chamber.

2. A material softer than the barrel 33, optionally plastic, may be used as a sleeve to cover the front casing 4 to tightly fit in the barrel 33.

3. A dry fire training device 1 integrally formed with a retaining pipe long enough to protrude out of the front end of the barrel 33 and which comprises threads or any other way to connect an end fastener.

4. A rubber sleeve or O-ring on the front end.

5. Leaf spring extensions out of the body of the device 1 or out of an attachment, creating pressure between the body of the laser bullet 1 and the inner surface of the barrel 33.

Additionally, one method of loading the dry fire training device and the associated retaining pipe assembly 45 into a working firearm may include placing the dry fire training device 1 into the chamber of the firearm, inserting the retaining pipe 45 into the barrel of the firearm, screwing the end of the retaining pipe 45 into the dry fire training device 1, compressing a resilient member between the retaining pipe 45 and the dry fire training system 1, and securing a reversible beveled fastener 47 to the other end of the dry fire training device 1 to align the retaining pipe 45 with the firearm barrel and fix the retaining pipe to the firearm barrel.

The above examples and description have been provided only for the purpose of illustration, and are not intended to limit the invention in any way. As will be appreciated by a skilled artisan, the invention can be carried out in a variety of ways, employing more than one technique from those described above, all without exceeding the scope of the invention.

What is claimed is:

1. A dry fire training device for emitting light through a barrel of a firearm, comprising:
    an illuminator for emitting a beam of light from the barrel of the firearm;
    a control circuit for supplying power to the illuminator to emit the beam of light; and
    a power supply positioned between the control circuit and the illuminator for providing power to the illuminator and the control circuit,
    wherein the control circuit is connected by two electric conductors to the illuminator, a first conductor connected to a first pole of the illuminator and the power supply, and a second conductor connected to a second pole of the illuminator, and
    wherein the electric conductors do not include a casing of the device.

2. The dry fire training device of claim 1, wherein the control circuit includes a capacitor.

3. The dry fire training device of claim 1 wherein the control circuit includes an electrically rechargeable component.

4. The dry fire training device of claim 1, wherein the first casing including an actuator for generating an electric indication in response to a mechanical activation of the firearm.

* * * * *